(12) United States Patent
Sheikman et al.

(10) Patent No.: US 8,854,052 B2
(45) Date of Patent: Oct. 7, 2014

(54) SENSOR ASSEMBLY AND METHOD OF MEASURING THE PROXIMITY OF A MACHINE COMPONENT TO A SENSOR

(75) Inventors: Boris Leonid Sheikman, Minden, NV (US); Steven Go, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 922 days.

(21) Appl. No.: 12/951,447

(22) Filed: Nov. 22, 2010

(65) Prior Publication Data
US 2012/0126826 A1    May 24, 2012

(51) Int. Cl.
G01R 27/04 (2006.01)
G01B 7/02 (2006.01)
G01B 15/00 (2006.01)

(52) U.S. Cl.
CPC .............. *G01B 7/023* (2013.01); *G01B 15/00* (2013.01)
USPC ........................................................ 324/629

(58) Field of Classification Search
CPC ............ G01V 3/12; G01S 7/282; G01D 5/00
See application file for complete search history.

(56) References Cited

U.S. PATENT DOCUMENTS

| | | |
|---|---|---|
| 4,045,727 A | 8/1977 | Yu et al. |
| 4,313,118 A | 1/1982 | Calvin |
| 4,346,383 A | 8/1982 | Woolcock et al. |
| 4,384,819 A | 5/1983 | Baker |
| 4,652,864 A | 3/1987 | Calvin |
| 4,845,422 A | 7/1989 | Damon |
| 4,862,061 A | 8/1989 | Damon |
| 5,097,227 A | 3/1992 | Yuan et al. |
| 5,227,667 A | 7/1993 | Takinami et al. |
| 5,334,969 A | 8/1994 | Abe et al. |
| 5,459,397 A | 10/1995 | Spillman, Jr. |
| 5,459,405 A | 10/1995 | Wolff et al. |
| 5,506,515 A | 4/1996 | Godshalk et al. |
| 5,600,253 A | 2/1997 | Cohen et al. |
| 5,670,886 A | 9/1997 | Wolff et al. |
| 5,801,530 A | 9/1998 | Crosby et al. |
| 5,818,242 A | 10/1998 | Grzybowski et al. |
| 5,854,994 A | 12/1998 | Canada et al. |
| 5,963,034 A | 10/1999 | Mahapatra et al. |
| 5,992,237 A | 11/1999 | McCarty et al. |
| 6,043,774 A | 3/2000 | Singh et al. |
| 6,118,287 A | 9/2000 | Boll et al. |

(Continued)

FOREIGN PATENT DOCUMENTS

GB      2199664 A      7/1988

OTHER PUBLICATIONS

Search Report and Written Opinion from corresponding EP Application No. 11189223.8-2213 dated Feb. 15, 2012.

(Continued)

*Primary Examiner* — Tung X Nguyen
(74) *Attorney, Agent, or Firm* — Fletcher Yoder P.C.

(57) ABSTRACT

A microwave sensor assembly includes a signal processing device for generating at least one microwave signal that includes a pattern of frequencies and at least one probe coupled to the signal processing device. The probe includes an emitter configured to generate an electromagnetic field from the at least one microwave signal, wherein the emitter is detuned when an object is positioned within the electromagnetic field such that a loading signal is reflected from the emitter to the signal processing device.

22 Claims, 5 Drawing Sheets

(56) References Cited

U.S. PATENT DOCUMENTS

| | | |
|---|---|---|
| 6,227,703 B1 | 5/2001 | DiMatteo et al. |
| 6,261,247 B1 | 7/2001 | Ishikawa et al. |
| 6,320,550 B1 | 11/2001 | Van Voorhies |
| 6,407,562 B1 | 6/2002 | Whiteman |
| 6,437,751 B1 | 8/2002 | Craven et al. |
| 6,445,995 B1 | 9/2002 | Mollmann |
| 6,462,561 B1 | 10/2002 | Bigelow et al. |
| 6,620,057 B1 | 9/2003 | Pirritano et al. |
| 6,750,621 B2 | 6/2004 | Gandrud |
| 6,778,132 B2 | 8/2004 | Palata |
| 6,864,796 B2 | 3/2005 | Lehrman et al. |
| 6,878,147 B2 | 4/2005 | Prakash et al. |
| 6,984,994 B2 | 1/2006 | Gregg |
| 7,073,384 B1 | 7/2006 | Donskoy et al. |
| 7,079,029 B2 | 7/2006 | Tsuji |
| 7,079,030 B2 | 7/2006 | Tsuji |
| 7,119,737 B2 | 10/2006 | Tsuji |
| 7,159,774 B2 | 1/2007 | Woodard et al. |
| 7,176,829 B2 | 2/2007 | Tsuji |
| 7,206,719 B2 | 4/2007 | Lindsay et al. |
| 7,215,111 B2 | 5/2007 | Kaneyasu et al. |
| 7,215,252 B2 | 5/2007 | Schenck |
| 7,216,054 B1 * | 5/2007 | Pchelnikov et al. .......... 702/150 |
| 7,250,920 B1 | 7/2007 | Steinbrecher |
| 7,256,376 B2 | 8/2007 | Tsuji |
| 7,274,189 B2 | 9/2007 | Chen et al. |
| 7,318,824 B2 | 1/2008 | Prakash et al. |
| 7,423,934 B1 | 9/2008 | Uzes |
| 7,455,495 B2 | 11/2008 | Leogrande et al. |
| 7,483,800 B2 | 1/2009 | Geisheimer et al. |
| 7,492,165 B2 | 2/2009 | Maier et al. |
| 7,527,623 B2 | 5/2009 | Prakash et al. |
| 7,532,151 B2 | 5/2009 | Touge et al. |
| 7,541,995 B1 | 6/2009 | Murphy, Jr. |
| 7,554,324 B2 | 6/2009 | Gualtieri |
| 7,604,413 B2 | 10/2009 | Koike et al. |
| 7,760,134 B2 * | 7/2010 | Morinaga et al. ............. 342/175 |
| 2008/0303513 A1 | 12/2008 | Turner |
| 2009/0102451 A1 | 4/2009 | Kwark |
| 2009/0243915 A1 | 10/2009 | Nishizato et al. |
| 2010/0125269 A1 | 5/2010 | Emmons et al. |
| 2010/0211334 A1 | 8/2010 | Sheikman et al. |

OTHER PUBLICATIONS

Woods, G. S. et al., "A High Accuracy Microwave Ranging System for Industrial Applications", IEEE Transactions on Instrumentation and Measurement, vol. 42, No. 4, pp. 812-816, Aug. 1, 1993.

Sorin, Fericean et al., "Development of a Microwave Proximity Sensor for Industrial Applications", IEEE Sensors Journal, vol. 9, No. 7, pp. 870-876, Jul. 1, 2009.

\* cited by examiner

SENSOR ASSEMBLY AND METHOD OF MEASURING THE PROXIMITY OF A MACHINE COMPONENT TO A SENSOR

BACKGROUND OF THE INVENTION

The present application relates generally to power systems and, more particularly, to a sensor assembly and a method of measuring the proximity of a machine component relative to a sensor.

Known machines may exhibit vibrations and/or other abnormal behavior during operation. One or more sensors may be used to measure and/or monitor such behavior and to determine, for example, an amount of vibration exhibited in a machine drive shaft, a rotational speed of the machine drive shaft, and/or any other operational characteristic of an operating machine or motor. Often, such sensors are coupled to a machine monitoring system that includes a plurality of monitors. The monitoring system receives signals from one or more sensors, performs at least one processing step on the signals, and transmits the modified signals to a diagnostic platform that displays the measurements to a user.

At least some known machines use eddy current sensors to measure the vibrations in and/or a position of a machine component. However, the use of known eddy current sensors may be limited because a detection range of such sensors is only about half of a width of the eddy current sensing element. Other known machines use optical sensors to measure a vibration and/or a position of a machine component. However, known optical sensors may become fouled by contaminants and provide inaccurate measurements, and as such, may be unsuitable for industrial environments. Moreover, known optical sensors may not be suitable for detecting a vibration and/or a position of a machine component through a liquid medium and/or a medium that includes particulates.

BRIEF DESCRIPTION OF THE INVENTION

In one embodiment, a microwave sensor assembly is provided that includes a signal processing device for generating at least one microwave signal that includes a pattern of frequencies and at least one probe coupled to the signal processing device. The probe includes an emitter configured to generate an electromagnetic field from the at least one microwave signal, wherein the emitter is detuned when an object is positioned within the electromagnetic field such that a loading signal is reflected from the emitter to the signal processing device.

In another embodiment, a power system is provided that includes a machine including at least one component and a microwave sensor assembly positioned proximate to the at least one component. The microwave sensor assembly includes a signal processing device for generating at least one microwave signal that includes a pattern of frequencies and at least one probe coupled to the signal processing device. The probe includes an emitter configured to generate an electromagnetic field from the at least one microwave signal, wherein the emitter is detuned when an object is positioned within the electromagnetic field such that a loading signal is reflected from the emitter to the signal processing device.

In yet another embodiment, a method for measuring a proximity of a machine component to an emitter is provided. The method includes transmitting at least one microwave signal that includes a pattern of frequencies to an emitter and generating an electromagnetic field from the at least one microwave signal. A loading signal representative of a disruption of the electromagnetic field is generated, and the proximity of the machine component to the emitter is calculated based on the loading signal.

DETAILED DESCRIPTION OF THE INVENTION

Figure 1:
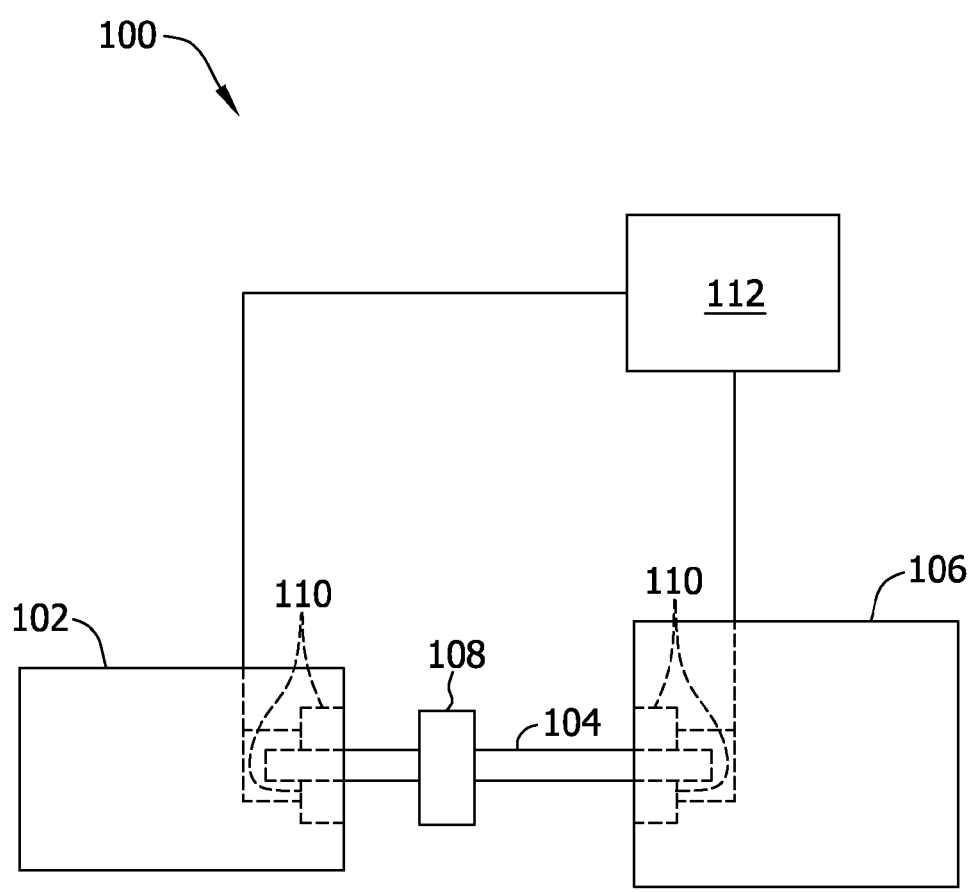
FIG. 1 is a block diagram of an exemplary power system.

FIG. 1 shows an exemplary power system 100 that includes a machine 102. In the exemplary embodiment, machine 102 may be, but is not limited to only being, a wind turbine, a hydroelectric turbine, a gas turbine, or a compressor. Alternatively, machine 102 may be any other machine used in a power system. In the exemplary embodiment, machine 102 rotates a drive shaft 104 that is coupled to a load 106, such as a generator.

In the exemplary embodiment, drive shaft 104 is at least partially supported by one or more bearings (not shown) housed within machine 102 and/or within load 106. Alternatively or additionally, the bearings may be housed within a separate support structure 108, such as a gearbox, or within any other structure or component that enables power system 100 to function as described herein.

In the exemplary embodiment, power system 100 includes at least one sensor assembly 110 that measures and/or monitors at least one operating condition of machine 102, of drive shaft 104, of load 106, and/or of any other component of power system 100 that enables system 100 to function as described herein. More specifically, in the exemplary embodiment, sensor assembly 110 is a proximity sensor assembly 110 that is positioned in close proximity to drive shaft 104 for measuring and/or monitoring a distance (not shown in FIG. 1) defined between drive shaft 104 and sensor assembly 110. Moreover, in the exemplary embodiment, sensor assembly 110 uses microwave signals to measure a proximity of a component of power system 100 with respect to sensor assembly 110. As used herein, the term "microwave" refers to a signal or a component that receives and/or transmits signals having one or more frequencies between about 300 Megahertz (MHz) and about 300 Gigahertz (GHz). Alternatively, sensor assembly 110 may measure and/or monitor any other component of power system 100, and/or may be any other sensor or transducer assembly that enables power system 100 to function as described herein. In the exemplary embodiment, each sensor assembly 110 is positioned in any location within power system 100. Moreover, in the exemplary embodiment, at least one sensor assembly 110 is coupled to a diagnostic system 112 for use in processing and/or analyzing one or more signals generated by sensor assemblies 110.

During operation, in the exemplary embodiment, the operation of machine 102 may cause one or more components of power system 100, such as drive shaft 104, to change position with respect to at least one sensor assembly 110. For example, vibrations may be induced to the components and/or the components may expand or contract as the operating temperature within power system 100 changes. In the exemplary embodiment, sensor assemblies 110 measure and/or monitor the proximity and/or the position of the components relative to each sensor assembly 110 and transmit a signal representative of the measured proximity and/or position of the components (hereinafter referred to as a "proximity measurement signal") to diagnostic system 112 for processing and/or analysis.

Figure 2:
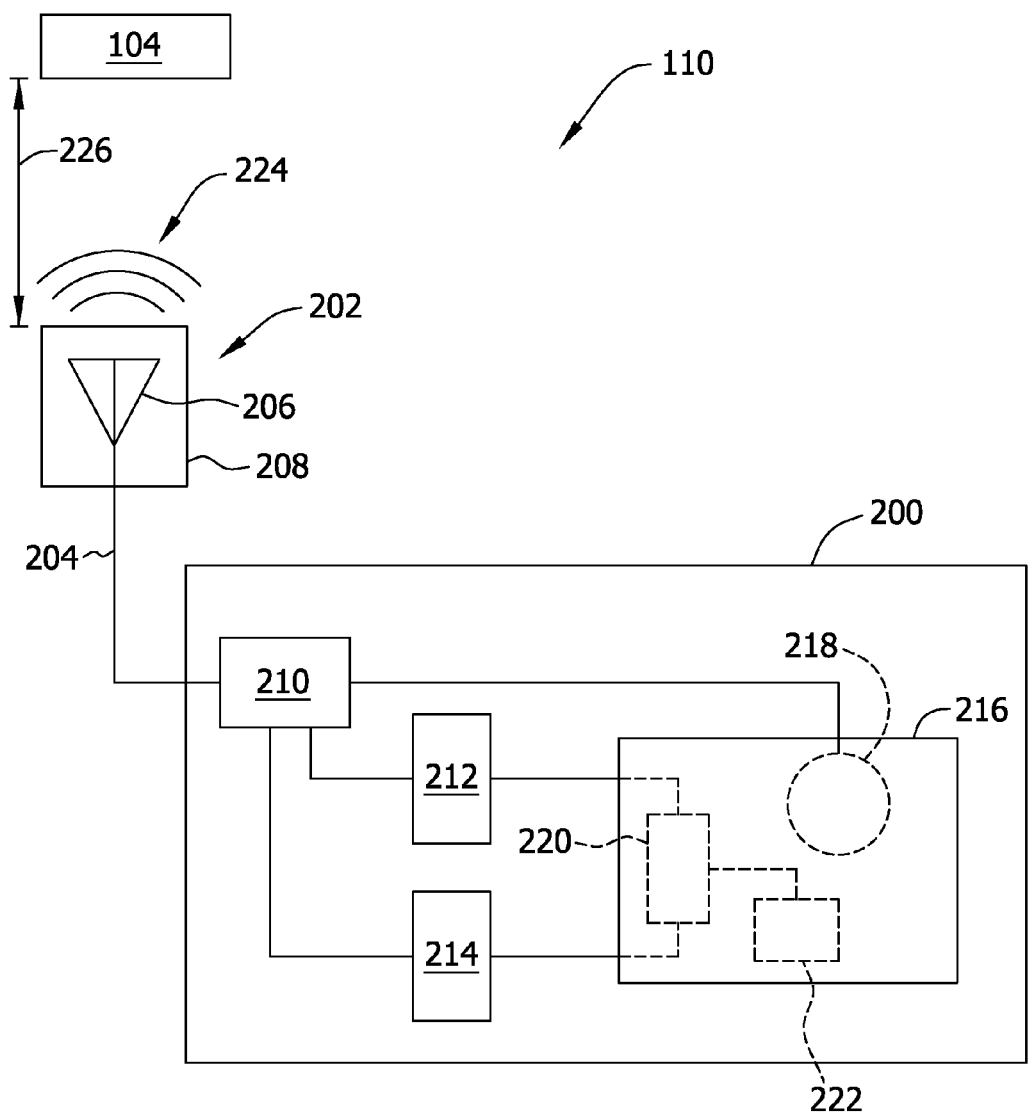
FIG. 2 is a block diagram of an exemplary sensor assembly that may be used with the power system shown in FIG. 1.

FIG. 2 is a schematic diagram of an exemplary sensor assembly 110 that may be used with power system 100 (shown in FIG. 1). In the exemplary embodiment, sensor assembly 110 includes a signal processing device 200 and a probe 202 that is coupled to signal processing device 200 via a data conduit 204. Moreover, in the exemplary embodiment, probe 202 includes an emitter 206 that is coupled to and/or positioned within a probe housing 208. More specifically, in the exemplary embodiment, probe 202 is a microwave probe 202 that includes a microwave emitter 206. As such, in the exemplary embodiment, emitter 206 has at least one resonant frequency that is within a microwave frequency range.

In the exemplary embodiment, signal processing device 200 includes a directional coupling device 210 that is coupled to a transmission power detector 212, to a reception power detector 214, and to a signal conditioning device 216. Moreover, in the exemplary embodiment, signal conditioning device 216 includes a signal generator 218, a subtractor 220, and a linearizer 222. Emitter 206 emits an electromagnetic field 224 when a microwave signal is transmitted through emitter 206.

During operation, in the exemplary embodiment, signal generator 218 generates at least one electrical signal having a microwave frequency (hereinafter referred to as a "microwave signal") that is equal or approximately equal to the resonant frequency of emitter 206. Signal generator 218 transmits the microwave signal to directional coupling device 210. Directional coupling device 210 transmits the microwave signal to transmission power detector 212 and to emitter 206. As the microwave signal is transmitted through emitter 206, electromagnetic field 224 is emitted from emitter 206 and out of probe housing 208. If an object, such as a drive shaft 104 or another component of machine 102 (shown in FIG. 1) and/or of power system 100 enters and/or changes a relative position within electromagnetic field 224, an electromagnetic coupling may occur between the object and field 224. More specifically, because of the presence of the object within electromagnetic field 224 and/or because of such object movement, electromagnetic field 224 may be disrupted, for example, because of an induction and/or capacitive effect induced within the object that may cause at least a portion of electromagnetic field 224 to be inductively and/or capacitively coupled to the object as an electrical current and/or charge. In such an instance, emitter 206 is detuned (i.e., a resonant frequency of emitter 206 is reduced and/or changed) and a loading is induced to emitter 206. The loading induced to emitter 206 causes a reflection of the microwave signal (hereinafter referred to as a "detuned loading signal") to be transmitted through data conduit 204 to directional coupling device 210. In the exemplary embodiment, the detuned loading signal has a lower power amplitude and/or a different phase than the power amplitude and/or the phase of the microwave signal. Moreover, in the exemplary embodiment, the power amplitude of the detuned loading signal is dependent upon the proximity of the object to emitter 206. Directional coupling device 210 transmits the detuned loading signal to reception power detector 214.

In the exemplary embodiment, reception power detector 214 determines an amount of power based on and/or contained within the detuned loading signal and transmits a signal representative of the detuned loading signal power to signal conditioning device 216. Moreover, transmission power detector 212 determines an amount of power based on and/or contained within the microwave signal and transmits a signal representative of the microwave signal power to signal conditioning device 216. In the exemplary embodiment, subtractor 220 receives the microwave signal power and the detuned loading signal power, and calculates a difference between the microwave signal power and the detuned loading signal power. Subtractor 220 transmits a signal representative of the calculated difference (hereinafter referred to as a "power difference signal") to linearizer 222. In the exemplary embodiment, an amplitude of the power difference signal is proportional, such as, without limitation, inversely, exponentially, and/or logarithmically proportional, to a distance 226 defined between the object, such as drive shaft 104, within electromagnetic field 224 and probe 202 and/or emitter 206 (i.e., distance 226 is known as the object proximity). Depending on the characteristics of emitter 206, such as, for example, the geometry of emitter 206, the amplitude of the power difference signal may at least partially exhibit a non-linear relationship with respect to the object proximity.

In the exemplary embodiment, linearizer 222 transforms the power difference signal into a voltage output signal (i.e., the "proximity measurement signal") that exhibits a substantially linear relationship between the object proximity and the amplitude of the proximity measurement signal. Moreover, in the exemplary embodiment, linearizer 222 transmits the proximity measurement signal to diagnostic system 112 (shown in FIG. 1) with a scale factor that is suitable for processing and/or analysis within diagnostic system 112. In the exemplary embodiment, the proximity measurement signal has a scale factor of volts per millimeter. Alternatively, the proximity measurement signal may have any other scale factor that enables diagnostic system 112 and/or power system 100 to function as described herein.

Figure 3:
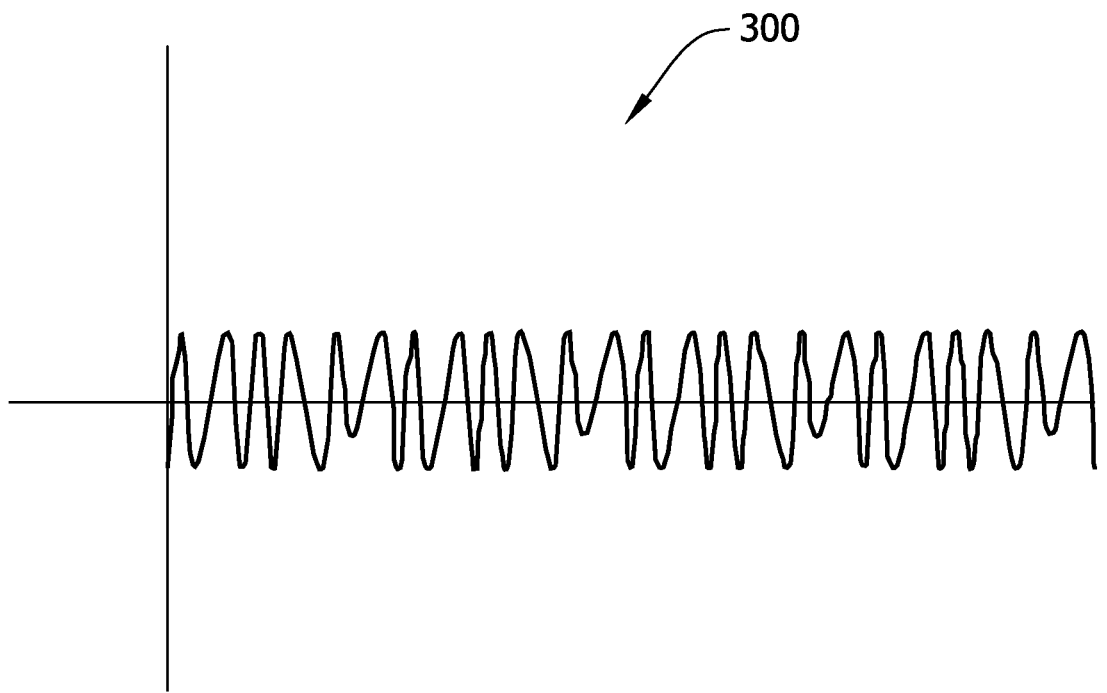
FIG. 3 is a graphical view of an exemplary microwave signal that may be used with the sensor assembly shown in FIG. 2.
Figure 4:
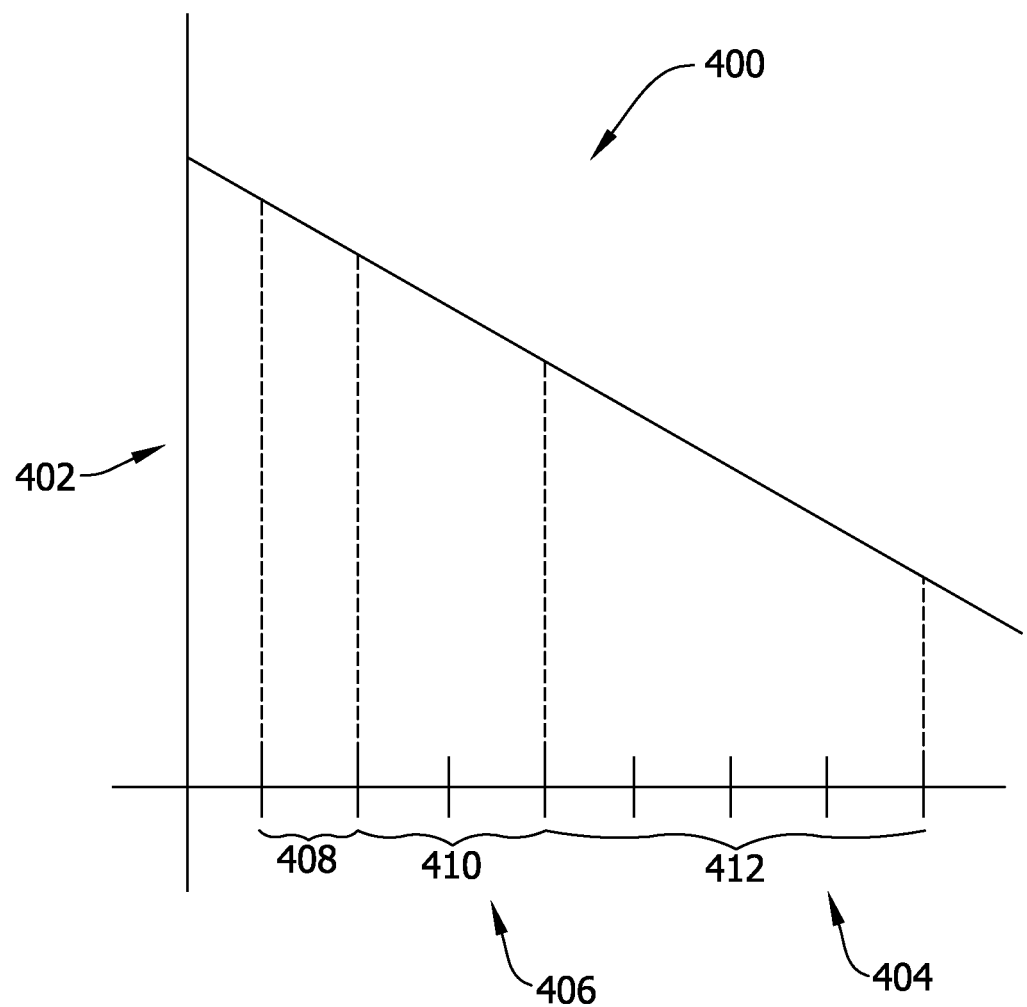
FIG. 4 is a graphical view of an exemplary power distribution of the microwave signal shown in FIG. 3.

FIG. 3 is a graphical view of an exemplary microwave signal 300 that may be generated by signal generator 218 (shown in FIG. 2). FIG. 4 is a graphical view of an exemplary power distribution 400 of microwave signal 300. More specifically, power distribution 400 is representative of an amount of power 402 (shown on the ordinate axis of FIG. 4) contained within microwave signal 300 at a specific frequency 404 (shown on the abscissa axis of FIG. 4). In the exemplary embodiment, signal generator 218 generates a microwave signal 300 that includes at least one pattern of frequencies. More specifically, in the exemplary embodiment, signal generator 218 generates a microwave signal 300 that is, or that includes, a pink noise signal. Alternatively, signal generator 218 generates a microwave signal 300 that is, or that includes, any signal that has a predefined amplitude and/or frequency pattern. As used herein, the term "pink noise" refers to a signal that has a power distribution 400 over a predefined frequency band 406 that is inversely proportional to the frequencies within frequency band 406. Moreover, a pink noise signal has a power distribution 400 that is substantially the same between octaves, partial octaves, and/or similar frequency bands 406 that are related and/or proportional to each other by a power of 2.

In the exemplary embodiment, microwave signal 300 includes a plurality of frequencies within one or more predefined frequency bands 406. Such frequency bands 406 may include a first frequency band 408, a second frequency band 410, and/or a third frequency band 412. More specifically, in the exemplary embodiment, second frequency band 410 is proportional to first frequency band 408 by a power of 2. For example, first frequency band 408 may include frequencies between about 1 Gigahertz (GHz) to about 2 GHz, and second frequency band 410 may include frequencies between about 2 GHz to about 4 GHz. Moreover, third frequency band 412 may include frequencies between about 4 GHz to about 8 GHz. As such, in the exemplary embodiment, power distributions 400 of microwave signal 300 are substantially equal over first frequency band 408, second frequency band 410, and/or third frequency band 412. In one embodiment, microwave signal 300 may have a center frequency of between about 3 GHz and about 5 GHz, and may have a bandwidth that includes first frequency band 408, second frequency band 410, and/or third frequency band 412. For example, in such an embodiment, the bandwidth of microwave signal 300 may be between about 100 kilohertz (KHz) and about 1 Megahertz (MHz). Alternatively, microwave signal 300, first frequency band 408, second frequency band 410, and/or third frequency band 412 may include any frequencies and/or frequency ranges that enable sensor assembly 110 (shown in FIG. 1) to function as described herein.

Figure 5:
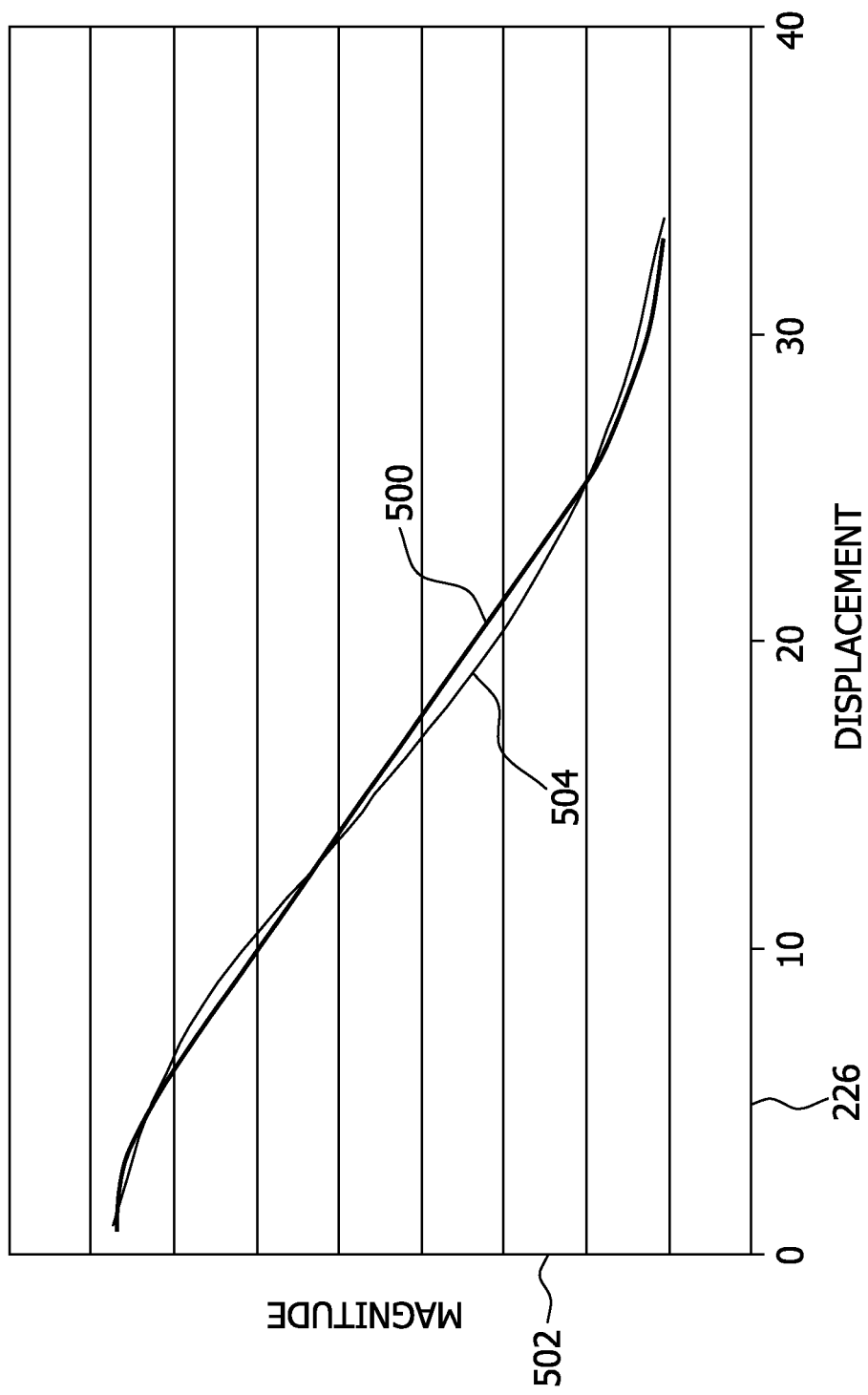
FIG. 5 is a graphical view of an exemplary proximity response of the sensor assembly shown in FIG. 2.

FIG. 5 is a graphical view of an exemplary proximity response 500 of sensor assembly 110 (shown in FIG. 1) that may be generated as sensor assembly 110 is driven by microwave signal 300 (shown in FIG. 3). In the exemplary embodiment, proximity response 500 is illustrative of the loading (not shown) induced to emitter 206 as described above in reference to FIG. 2. Moreover, in the exemplary embodiment, proximity response 500 illustrates a magnitude 502 (shown on the ordinate axis) of the power of the detuned loading signal (not shown) that is induced to emitter 206 (both shown in FIG. 2) as distance 226 (shown on the abscissa axis) of an object within electromagnetic field 224 changes with respect to emitter 206.

In the exemplary embodiment, as emitter 206 receives and/or is driven by the plurality of frequencies within first frequency band 408, second frequency band 410, and/or third frequency band 412 (all shown in FIG. 4) of microwave signal 300, sensor assembly 110 facilitates generating a proximity response 500 that is substantially linear. Moreover, in the exemplary embodiment, proximity response 500 is more linear than a proximity response 504 of sensor assembly 110 when emitter 206 is driven by a microwave signal (not shown) that includes only a single frequency. As used herein, the term "linear" refers to a substantially proportional relationship between two quantities, such as between a distance 226 of the object from emitter 206, and a magnitude 502 of the detuned loading signal power. Moreover, in the exemplary embodiment, emitter 206 is tuned to facilitate enabling sensor assembly 110 to generate a substantially linear proximity response 500 over a range of frequencies, such as over first frequency band 408, second frequency band 410, and/or third frequency band 412. Furthermore, driving emitter 206 with a pink noise-based microwave signal 300 facilitates increasing a detection range of sensor assembly 110 (i.e., a maximum distance 226 between the object and emitter 206 that enables a proximity response 500 to remain substantially linear).

Moreover, providing a pink noise-based microwave signal 300 to emitter 206 may facilitate tuning sensor assembly 110. For example, microwave signal 300 may be shifted, or "swept," through a plurality of frequencies and/or frequency bands 406 during operation of sensor assembly 110 to facilitate tuning emitter 206 and/or sensor assembly 110 to provide an optimal proximity response 500. Moreover, proximity response 500 may be optimized by selecting one or more frequencies and/or frequency bands 406 that provide one or more desired characteristics of proximity response 500, such as a maximum detection range, frequency stability, and/or any other desired characteristic.

The above-described embodiments provide an efficient and cost-effective sensor assembly for use in measuring the proximity of a machine component. The sensor assembly drives an emitter with a pink noise-based microwave signal to generate an electromagnetic field. When an object, such as a machine component, is positioned within the field, the object causes a disruption of the electromagnetic field. The disruption detunes the emitter, and a loading signal representative of a loading induced to the emitter is generated, or reflected from the microwave signal through a data conduit to a signal processing device. The sensor assembly calculates a proximity of the object based on the loading signal. In contrast to known sensors that drive an emitter with only a single frequency, the sensor assembly described herein drives an optimized emitter with a pink noise-based microwave signal that includes one or more frequency patterns. The microwave signal facilitates tuning the emitter and/or the sensor assembly, and facilitates generating a substantially linear proximity response signal from the emitter. As such, the pink noise-based microwave signal facilitates providing a stable and robust proximity measurement that is substantially linear as the distance between the object and the emitter changes.

Exemplary embodiments of a sensor assembly and a method for measuring a proximity of a machine component to an emitter are described above in detail. The sensor assembly and method are not limited to the specific embodiments described herein, but rather, components of the sensor assembly and/or steps of the method may be utilized independently and separately from other components and/or steps described herein. For example, the sensor assembly may also be used in combination with other measuring systems and methods, and is not limited to practice with only the power system as described herein. Rather, the exemplary embodiment can be implemented and utilized in connection with many other measurement and/or monitoring applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A microwave sensor assembly comprising:
a signal processing device for generating at least one microwave signal that includes a pattern of frequencies, wherein the signal processing device is configured to:
calculate a first amount of a microwave signal power contained in the at least one microwave signal;
calculate a second amount of a loading signal power contained in the loading signal; and
calculate a proximity of an object to the emitter based on a difference between the first amount of the microwave signal power and the second amount of the loading signal power; and at least one probe coupled to the signal processing device, the at least one probe comprising an emitter configured to generate an electromagnetic field from the at least one microwave signal, wherein the emitter is detuned when an object is positioned within the electromagnetic field such that a loading signal is reflected from the emitter to the signal processing device.

2. The microwave sensor assembly in accordance with claim 1, wherein the pattern of frequencies of the at least one microwave signal is proportional to a power distribution of the pattern of frequencies.

3. The microwave sensor assembly in accordance with claim 1, wherein the pattern of frequencies of the at least one microwave signal is inversely proportional to a power distribution of the pattern of frequencies.

4. The microwave sensor assembly in accordance with claim 1, wherein the pattern of frequencies of the at least one microwave signal is within a plurality of frequency bands, wherein a power distribution of a first frequency band of the plurality of frequency bands is substantially equal to a power distribution of a second frequency band of the plurality of frequency bands.

5. The microwave sensor assembly in accordance with claim 4, wherein the frequency range of the first frequency band is proportional to the frequency range of the second frequency band.

6. The microwave sensor assembly in accordance with claim 1, wherein the emitter is configured to generate a substantially linear output in relation to a distance of an object to the emitter when the emitter is driven by the at least one microwave signal.

7. The microwave sensor assembly in accordance with claim 6, wherein the emitter is further configured to generate a substantially linear output in relation to the distance of the object to the emitter when the emitter is driven by the at least one microwave signal, the at least one microwave signal including a pattern of frequencies that is inversely proportional to a power spectral density of the frequencies.

8. A power system comprising:
   a machine comprising at least one component; and
   a microwave sensor assembly positioned proximate to the at least one component, the microwave sensor assembly comprising:
      a signal processing device for generating at least one microwave signal that includes a pattern of frequencies, wherein the signal processing device is configured to:
         calculate a first amount of a microwave signal power contained in the at least one microwave signal;
         calculate a second amount of a loading signal power contained in the loading signal; and
         calculate a proximity of the at least one component to the emitter based on a difference between the first amount of the microwave signal power and the second amount of the loading signal power; and
      at least one probe coupled to the signal processing device, the at least one probe comprising an emitter configured to generate an electromagnetic field from the at least one microwave signal, wherein the emitter is detuned when an object is positioned within the electromagnetic field such that a loading signal is reflected from the emitter to the signal processing device.

9. The power system in accordance with claim 8, wherein the pattern of frequencies of the at least one microwave signal is proportional to a power distribution of the pattern of frequencies.

10. The power system in accordance with claim 8, wherein the pattern of frequencies of the at least one microwave signal is inversely proportional to a power distribution of the pattern of frequencies.

11. The power system in accordance with claim 8, wherein the pattern of frequencies of the at least one microwave signal is within a plurality of frequency bands, wherein a power distribution of a first frequency band of the plurality of frequency bands is substantially equal to a power distribution of a second frequency band of the plurality of frequency bands.

12. The power system in accordance with claim 11, wherein the frequency range of the first frequency band is proportional to the frequency range of the second frequency band.

13. The power system in accordance with claim 8, wherein the emitter is configured to generate a substantially linear output in relation to a distance from the at least one component to the emitter when the emitter is driven by the at least one microwave signal.

14. The power system in accordance with claim 13, wherein the emitter is further configured to generate a substantially linear output in relation to the distance from the at least one component to the emitter when the emitter is driven by the at least one microwave signal, the at least one microwave signal including a pattern of frequencies that is inversely proportional to a power spectral density of the frequencies.

15. A method for measuring a proximity of a machine component relative to an emitter, the method comprising:
   transmitting at least one microwave signal that includes a pattern of frequencies to the emitter;
   generating an electromagnetic field from the at least one microwave signal;
   generating a loading signal representative of a disruption of the electromagnetic field when the machine component is positioned within the electromagnetic field;
   calculating a first amount of a microwave signal power contained in the at least one microwave signal;
   calculating a second amount of a loading signal power contained in the loading signal; and
   calculating the proximity of the machine component to the emitter based on a difference between the first amount of the microwave signal power and the second amount of the loading signal power; and
   calculating the proximity of the machine component to the emitter based on the loading signal.

16. The method in accordance with claim 15, wherein the pattern of frequencies of the at least one microwave signal is inversely proportional to a power distribution of the pattern of frequencies.

17. The method in accordance with claim 15, wherein the pattern of frequencies of the at least one microwave signal is within a plurality of frequency bands, wherein a power distribution of a first frequency band of the plurality of frequency bands is substantially equal to a power distribution of a second frequency band of the plurality of frequency bands.

18. The microwave sensor assembly in accordance with claim 1, wherein the loading signal is representative of a disruption of the electromagnetic field, and the signal processing device is configured to calculate the proximity of the object to the emitter based on the loading signal.

19. The power system in accordance with claim 8, wherein the loading signal is representative of a disruption of the electromagnetic field, and the signal processing device is configured to calculate the proximity of the at least one component to the emitter based on the loading signal.

20. The microwave sensor assembly in accordance with claim 1, wherein the at least one microwave signal comprises a pink noise signal.

21. The power system in accordance with claim 8, wherein the at least one microwave signal comprises a pink noise signal.

22. The method in accordance with claim 15, wherein the at least one microwave signal comprises a pink noise signal.

* * * * *